(12) United States Patent
Van Essche et al.

(10) Patent No.: US 12,195,979 B2
(45) Date of Patent: Jan. 14, 2025

(54) MULTILAYER FLOOR PANEL BASED ON A PVC PLASTISOL

(71) Applicant: BEAULIEU INTERNATIONAL GROUP NV, Waregem (BE)

(72) Inventors: Sam Van Essche, Ghent (BE); Hanna Eggermont, Ghent (BE); Pol Lombaert, Nazareth (BE); Jonas Guido Feys, Drongen (BE); Frans Van Giel, Kortrijk (BE)

(73) Assignee: BEAULIEU INTERNATIONAL GROUP NV, Waregem (BE)

( * ) Notice: Subject to any disclaimer, the term of this patent is extended or adjusted under 35 U.S.C. 154(b) by 305 days.

(21) Appl. No.: 17/776,731

(22) PCT Filed: Nov. 16, 2020

(86) PCT No.: PCT/EP2020/082307
§ 371 (c)(1),
(2) Date: May 13, 2022

(87) PCT Pub. No.: WO2021/094625
PCT Pub. Date: May 20, 2021

(65) Prior Publication Data
US 2022/0389722 A1 Dec. 8, 2022

(30) Foreign Application Priority Data
Nov. 15, 2019 (EP) ..................................... 19209546

(51) Int. Cl.
*E04F 15/10* (2006.01)
*B05D 1/38* (2006.01)
(Continued)

(52) U.S. Cl.
CPC .............. *E04F 15/107* (2013.01); *B05D 1/38* (2013.01); *B05D 3/105* (2013.01); *B05D 3/12* (2013.01);
(Continued)

(58) Field of Classification Search
CPC ........ E04F 15/107; E04F 15/105; B05D 7/56; C08J 3/075; C08J 7/042; C08J 9/103;
(Continued)

(56) References Cited

U.S. PATENT DOCUMENTS 3,870,591 A   3/1975 Witman
4,217,385 A * 8/1980 Shortway ................. D06N 3/08
                                                156/219
(Continued)

FOREIGN PATENT DOCUMENTS

AU        8450575        4/1977
CA        2638153 A1 *  1/2009 ........... C07D 251/34
(Continued)

OTHER PUBLICATIONS

Office Action issued in parallel Eurasian patent application No. 202200054, dated Nov. 17, 2022, with English translation.
(Continued)

*Primary Examiner* — Brent W Herring
(74) *Attorney, Agent, or Firm* — HSML P. C.

(57) ABSTRACT

Floor panels that includes a substrate and a multi-layered top layer directed attached to the substrate. The multi-layered top layer includes a décor layer that includes a fused PVC plastisol, a print pattern deposited as single or stacked dots of a digitally printed material on top of the décor layer, a wear-resistant layer including a fused PVC plastisol provided above the print pattern. Optionally, a lacquer layer is provided directly on top of the wear-resistant layer.

23 Claims, 4 Drawing Sheets

(51) Int. Cl.
    *B05D 3/10*         (2006.01)
    *B05D 3/12*         (2006.01)
    *B05D 7/00*         (2006.01)
    *C08J 3/075*       (2006.01)
    *C08J 7/04*         (2020.01)
    *C08J 9/10*         (2006.01)
    *C09D 127/06*     (2006.01)

(52) U.S. Cl.
    CPC ............... *B05D 7/56* (2013.01); *C08J 3/075* (2013.01); *C08J 7/042* (2013.01); *C08J 9/103* (2013.01); *C09D 127/06* (2013.01); *E04F 15/105* (2013.01); *C08J 2327/06* (2013.01)

(58) Field of Classification Search
    CPC ............... C08J 2327/06; C09D 127/06; B32B 2266/0235; B32B 2307/4023
    See application file for complete search history.

(56) References Cited

U.S. PATENT DOCUMENTS

| | | | | |
|---|---|---|---|---|
| 4,298,646 A | * | 11/1981 | Haemer | B44C 1/205 428/206 |
| 4,450,194 A | * | 5/1984 | Kauffman | B32B 3/30 428/206 |
| 4,456,643 A | * | 6/1984 | Colyer | B32B 5/245 428/318.6 |
| 6,759,096 B2 | * | 7/2004 | MacQueen | D06N 3/06 427/500 |
| 7,217,459 B2 | | 5/2007 | Shah | |

FOREIGN PATENT DOCUMENTS

| | | |
|---|---|---|
| CN | 107405860 | 11/2017 |
| CN | 109789661 | 5/2019 |
| CN | 110036161 | 7/2019 |
| EP | 3129567 B1 | 8/2020 |
| JP | H01110123 A | 4/1989 |
| WO | 2015158596 A1 | 10/2015 |
| WO | 2016113377 A1 | 7/2016 |
| WO | 2018015357 A1 | 1/2018 |

OTHER PUBLICATIONS

International Search Report and Written Opinion issued in PCT/EP2020/082307, mailed Mar. 9, 2021.
The extended European search report issued in European Application No. 19209546.1, dated May 27, 2020.
Certificate of Correction of U.S. Pat. No. 3,870,591, dated May 20, 1975.
Krekeler/Wick, Kunststoff-Handbuch [Plastics Handbook] (1963), vol. 11, Part 1, pp. 396, with English translation.
Chinese Office Action issued in corresponding Chinese Patent Application No. 202080079609.6, dated Feb. 25, 2023, 19 pages, machine translation provided.

* cited by examiner

MULTILAYER FLOOR PANEL BASED ON A PVC PLASTISOL

FIELD OF THE INVENTION

The present invention relates to floor panels having a multi-layered top layer comprising polyvinyl chloride. More particularly, the invention relates to floor panels whereby a top layer is directly attached to a substrate. The invention furthermore relates to a method for producing such floor panels and to a system for performing such a process.

BACKGROUND OF THE INVENTION

Floor panels having a substrate and a multi-layered top layer comprising polyvinyl chloride are known in the art. These floor panels are often provided in the form of rectangular planks or square tiles comprising a mechanical locking system to assemble the panels together.

The substrate can be made of a thermoplastic board, which can be foamed. The substrate may also comprise wood-based or composite material. The multi-layered top layers known in the art contain a decor and a wear-resistant layer. The decor provides a visual aspect to the floor panel, for instance a representation of a natural material like wood or natural stone. The decor can be printed with printing inks by means of rotogravure, intaglio printing, or digital printing. The wear-resistant layer is transparent and applied on top of the decor to protect it from wear and tear.

In the manufacture of these floor panels, the top layer can be applied as a multi-layered film or as a stack of films. The one or more films are laminated to the substrate by means of calandering or pressing at elevated temperature. A drawback of these pressure-based methods is that the combination of heat and pressure can be destructive especially for foamed substrates, resulting in collapse of the foam cells. Another drawback of these laminated films is their tendency to delaminate from the substrate. Alternatively, an adhesive can be used to glue the top layer to the substrate. Still, problems can arise due to the fact that some adhesives loose part of their strength due to plasticizer migration from polyvinyl chloride top layer into the adhesive.

There is furthermore a continuing effort in the flooring industry to provide floor coverings with a unique and highly realistic natural appearance, for instance, a hardwood surface appearance. Wood can exhibit various surface structures depending on the wood and how it is prepared, e.g. whether it is cut to exhibit cut wood fibres or so that the fibres are generally parallel to wood cut surface. These surface structures can be enhanced by wood staining. Light is reflected from wood surfaces as gloss or scatter depending on the structure of the surface, i.e. depending upon micro- or sub-micro structures. Commonly used finishing methods such as sanding will influence the micro structure and light scattering. Micro structure is not visible from a normal viewing distance, but can be seen with a magnifying glass. Micro structure will influence the glossiness of a surface, but the resulting glossiness is always a combination of the micro structure and the nanoscale structure. Micro structures can have a slope with reference to the wood surface and that can influence the direction of the light scattering. Many structured surfaces have a combination of nano-, micro- and macroscale features. Macroscale features are visible to the naked eye such as a grain, a slope, a crack, a knot, a hole, etc. Macroscale features do not influence the glossiness of the surface but can influence the direction of it. Features like wood knots, wood grains, wood fibers are all macro-features.

Besides a decor, the surface of a floor covering therefore often contains a relief pattern, for instance one that tries to simulate a wood texture. The relief pattern is imprinted at elevated temperature and high pressure by means of an embossing mould. This mechanical embossing process causes a partial compression of the laminated films. The laminated film is heat-softened during the process, but still has sufficient elasticity to partially restore itself afterwards. This may result in a partial disappearance of the relief pattern after the mould is removed. Especially fine structures, which influence gloss and natural look, are difficult to be retained.

Another shortcoming of multi-layered floor panels is their tendency to curling. Curling is a phenomenon that is often observed in multi-layered materials that have a non-uniform composition and/or that contain zones of internal stress built-up during processing and in application. More specifically for floor panels consisting of multiple layers of different composition, it is believed that temperature changes impart different degrees of shrinking and/or expansion of the separate layers resulting in either positive or negative curling. Due to this curling, installed floor panels tend to become non-flat and may decouple from each other, leading to issues of visual aspect such as gaps between panels and damages. One or more reinforcement layers with a very low thermal expansion, such as glass fibre layers, or other additional layers may be included in the floor panel to counteract or counterbalance the thermal expansion of the thermoplastic material. This often results in complex multilayer designs, wherein all layers have different thermal properties. However, when these additional layers are not placed exactly in a way that thermal properties are balanced, curling may still occur, especially when latent tension is present in the material.

SUMMARY OF THE INVENTION

It is an object of embodiments of the present invention to overcome at least one of the drawbacks of the prior art. It is an object of embodiments of the present invention to provide a floor panel with reduced curling. In particular, it is an object to provide a floor panel with a simple product configuration that has good dimensional stability. It is further an object of embodiments of the present invention to provide a floor panel with good aesthetics, especially with a natural appearance.

Embodiments of the present invention provide floor panels having a multi-layered top layer comprising polyvinyl chloride. More particularly, embodiments of the present invention relate to floor panels whereby a top layer is directly attached to a substrate. The invention furthermore relates to a method for producing such floor panels and to a system for performing such a process.

Floor panels according to some embodiments of the present invention are defined in claims 1 to 22.

In a first aspect, the present invention relates to a floor panel comprising a substrate and a multi-layered top layer directly attached to the substrate, whereby the multi-layered top layer comprises a decor layer comprising a fused PVC plastisol, a print pattern deposited as single or stacked dots of a digitally printed material on top of the decor layer, a wear-resistant layer comprising a fused PVC plastisol provided above the print pattern, and, optionally, a lacquer layer provided directly on top of the wear-resistant layer. The lacquer layer can be a conformal layer i.e. the lacquer layer has the same thickness at all points on the wear-resistant layer. This has the advantage that any relief pattern in the wear-resistant layer or décor layer will be telegraphed through to the lacquer layer. The lacquer layer can be a continuous or discontinuous, transparent layer that conforms to mechanically and/or chemically embossed relief patterns to which it is applied. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

Methods for producing a floor panel according to some embodiments of the present invention are defined further herein.

According to a second aspect, the present invention relates to a method for producing a floor panel comprising the subsequent steps of providing a substrate, applying a first coating comprising a PVC plastisol directly onto the substrate to obtain a decor layer, gelling the decor layer, applying a print pattern of single or stacked dots of printing material onto the decor layer by means of digital printing, applying a second coating comprising a PVC plastisol onto the printed decor layer to obtain a wear-resistant layer, gelling the wear-resistant layer and subsequently fusing the decor layer and the wear-resistant layer, and optionally applying a lacquer layer directly on top of the fused wear-resistant layer.

The method can comprise the step of mechanically embossing the wear-resistant layer during gelling. An embossing mould can be in contact with the wear-resistant layer during gelling without exerting additional pressure. The embossing mould can be a release web and is preferably a polymer coated paper. The lacquer layer can be a conformal layer i.e. the lacquer layer has the same thickness at all points on the wear-resistant layer. This has the advantage that any relief pattern in the wear-resistant layer or from the décor layer will be telegraphed through to the lacquer layer. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

The lacquer layer can be applied as a continuous or discontinuous, transparent layer that conforms to mechanically and/or chemically embossed relief patterns to which it is applied.

DEFINITIONS

Figure 1:
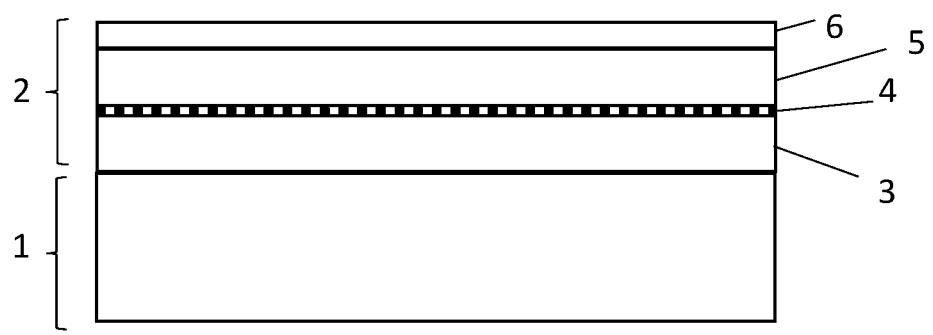
FIG. 1 shows a schematic representation of a floor panel according to the first aspect of the invention with indication of a substrate (1) and a multi-layered top layer (2) comprising a decor layer (3), a print pattern (4), a wear-resistant layer (5), and optionally a lacquer layer (6) directly on top of the wear-resistant layer.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The term "synthetic material" as used in the context of the current invention, can be a single polymer or a blend of two or more polymers. The synthetic material can be, for example, a thermoplastic polymer, a thermosetting polymer, a rubber (elastomer), or any combinations thereof. Further, the synthetic material can be comprised of, for example, any type of polymer, such as a homopolymer, a copolymer, a random polymer, alternating polymer, graft polymer, block polymer, star-like polymer, comb-like polymer, crosslinked polymer, and/or vulcanized polymer. The synthetic material can be, for example, comprised of a thermoplastic elastomer (TPE), an interpenetrating polymer network (IPN); simultaneous interpenetrating polymer network (SIN); or interpenetrating elastomeric network (IEN). The synthetic material may also include mixtures of synthetic polymers and natural polymers. The synthetic material can be a thermoplastic polymer that includes, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; polystyrenes and copolymers thereof, such as ABS, SAN, and polypropylene and copolymers thereof; saturated and unsaturated polyesters; acrylics; polyamides such as nylon containing types; engineering plastics such as polycarbonate, polyimide, polysulfone, and polyphenylene oxide and sulfide resins and the like. The synthetic material can be virgin, recycled, or a mixture of both. Furthermore, the synthetic material can be incorporated with a blowing agent(s) or a mechanically injected gas or fluid, such as supercritical carbon dioxide, to make a foamed or foamable structure.

The term "plasticizer" as referred herein is to be understood as a compound used to increase the fluidity or plasticity of a material, typically a polymer. A plasticizer for polyvinyl chloride may be a phthalic diester, such as diisononyl phthalate (DINP). Other examples of plasticizer include, but are not limited to ditridecylphthalate, diisodecyl phthalate, dipropylheptyl phthalate, diisooctyl terephthalate (DOTP), benzoates, adipates, any o-phthalate free plasticizers, natural-material based plasticizers, and the like.

The term "PVC plastisol" used herein refers to a suspension of PVC particles in a liquid plasticizer. A PVC plastisol flows as a liquid and can be poured. The formulation, preparation and use of plastisols is extensively described for instance in: Krekeler/Wick, Kunststoff-Handbuch [Plastics Handbook] (1963), Volume 11, Part 1, pp. 396. The polyvinyl chloride used to form a PVC plastisol may be a powder compound. The polyvinyl chloride may be a micro-suspension polymerisation grade, a suspension polymerization grade or emulsion grade polymer resin having a preferred molecular weight as reflected by its K-value. If the temperature is sufficiently high and the time is adequate a PVC plastisol changes from a liquid into a plasticized solid PVC material. Two consecutive transformation stages can be distinguished. The first stage is the gelation of the PVC plastisol. Gelation or gelling of a PVC plastisol is the process whereby absorption of the plasticizer(s) by the polymer particles brings about the formation of a so called "gelled plastisol", which is a dry and relatively weak gel. This state may be considered to exist until further heating results in fusion of the plastisol. During this second stage of transformation the PVC polymer particles become fully merged to form a physically homogeneous plasticized solid PVC material with mechanical and other properties developed to the full. The term "fused PVC plastisol" refers herein to a PVC plastisol in this final solid state.

The "K-value" of a polymer is a measure for the polymer chain length and is described in detail by for instance K. Fikentscher in "Cellulosechemie", 13, 58 (1932).

The term "reinforcement layer" used herein refers to a woven or a non-woven layer, such as a glass fibre cloth or a glass fibre fleece or a textile layer.

The term "interlayer adhesive material" used herein refers to a substance applied to one or both surfaces of two separate layers that binds them together and resists their separation. The interlayer adhesive material, for instance, can comprise a one-part or multiple part adhesive such as a two-component polyurethane liquid adhesive, for example a polyurethane or an epoxy; it can be a film such as double sided tape or pressure sensitive adhesive (PSA); or another layer or film comprising a material which is compatible with (i.e., bonds to) both a first layer and a second layer. Examples include polyolefin copolymers such as ethylene/vinyl acetate, ethylene/acrylic acid, ethylene/n-butyl acrylate, ethylene ionomers, ethylene/methylacrylate, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermoset polymers, and can include tacky, pressure-sensitive adhesives. In the context of the present invention, PVC-based adhesives are excluded from the definition of "interlayer adhesive material". The term "PVC-based adhesive" is to be understood as PVC being the main component of the adhesive which acts as a binder. Further suitable adhesives are foam craft adhesives such as 3M Styrofoam Spray Adhesive, adhesives based on dispersions, e.g. ACRONAL™ Acrylate Dispersions available from BASF, one-component polyurethane adhesive such as INSTASTIK™ available from The Dow Chemical Company, hot-melt adhesives, moisture-cured adhesives such as those described in U.S. Pat. No. 7,217,459B2, which is hereby incorporated by reference, single- or preferably two-component adhesives based on polyurethane resins or on epoxy resins.

The term "blowing agent" as referred herein relates to a substance which is capable of producing a foamed polymer layer. Blowing agents are well known in the art, see for instance Ullmann's Polymers and Plastics, 4 Volume Set: Products and Processes, p. 1578, Wiley-VCH Verlag, Weinheim, 2016. Blowing agents that generate gas after their incorporation into the polymer are termed "in situ blowing agents", and function by chemical decomposition of the blowing agent under the conditions of a so-called blowing step. An advantage of in situ blowing agents is that they are triggered selectively, whereby a foam is formed. Chemical blowing agents are typically solids which decompose at elevated temperatures, wherein a gas is formed, thereby driving the expansion of the "foamable layer" to a "foamed layer". Inorganic blowing agents may be employed, such as ammonium hydrogen carbonate, or organic blowing agents such as p-toluenesulfonhydrazide, 4,4'-oxybis-(benzenesulfonhydrazide), N,N'-dinitrosopentamethylenetetramine, or azodicarbonamide. Organic blowing agents provide a number of advantages over inorganic blowing agents as they allow easier dispersion in the polymer formulation, provide higher gas yields, decompose within a narrower temperature range and are sufficiently stable upon storage. Also, their decomposition temperature can be lowered below the working temperature by activation through the use of active "kickers". Through deactivation of the kicker by inhibiting agents or increasing the thermal stability of the blowing agent, the decomposition temperature of the blowing agent-kicker mixture increases to a value above the working temperature. Preferably, the foamable compositions employed herein comprises a nitrogen containing chemical blowing agent. The blowing agents which have found the most wide-spread use are those compounds having N—N bonds which decompose at elevated temperature to yield an inert gas high in nitrogen, also referred to as "nitrogen containing blowing agents". Nitrogen has a low permeability in polymers, which is highly desirable to prepare for instance closed cell foam layers. A particularly useful nitrogen containing blowing agent for polymers is azodicarbonamide. Thermal decomposition of azodicarbonamide results in the evolution of nitrogen, carbon monoxide, carbon dioxide, and ammonia gases, which are trapped in the polymer as bubbles to form a foamed article. While azodicarbonamide can be used neat, it preferably is modified to affect the decomposition temperature range. Generally, blowing agent decomposition is a function of chemical activation, particle size and temperature. Accordingly, it is common practice to add kickers into the compositions to reduce the decomposition temperature and/or to narrow the decomposition temperature range. While azodicarbonamide generally starts to decompose at 200° C., addition of a kicker, such as zinc oxide, allows to reduce the decomposition temperature to the range of from 160° C. to 195° C. Useful blowing agent kickers include, but are not limited to citric acid, oxalic acid, toluene sulfonic acid, phosphoric acid, potassium carbonate, borax, triethanol amine, zinc chloride, zinc acetate, zinc oxide, zinc stearate, barium stearate, calcium stearate, urea and polyethylene glycol. Preferably, the at least one blowing kicker comprises zinc oxide, or zinc oxide and urea. The nitrogen containing blowing agent and at least one blowing agent kicker are preferably compounded together prior to being added to the polymer material. Highly kicked azodicarbonamide is preferred to produce chemically embossed foam. Azodicarbonamide, combined with a kicker, is a preferred blowing agent in the formation of foamable material, in particular in materials comprising polyvinyl chloride (PVC), specifically plasticized PVC, as it can be incorporated easily into the polymer material. The preferred kicker for this invention is zinc oxide and/or urea. The quantity of the kicker is generally from about 10% to 70% by weight of the azodicarbonamide, preferably from 20% to 50% and most preferably from about 35% to 45%. Since the particle size is also relevant for the speed and release of gas, as well as the size of the foam cells thus formed, the nitrogen containing blowing agent and at least one blowing agent and kicker preferably have an average particle size of less than 5 μm, more preferably less than 4 μm as measured by a laser particle size measuring device. The blowing agent is preferably uniformly dispersed in the foamable layer.

The process term "digital printing" herein refers to a method of printing digital-based images or patterns directly onto a substrate. Digital printing results in single or stacked dots of a printed material being deposited on a surface, with interstitial unprinted areas. Examples of digital printing techniques include inkjet printing and laser printing. The preferred digitally printing technique herein is inkjet printing. Inkjet printing is a digital printing technique known in the art that recreates a digital image or pattern by propelling droplets of a printing material onto a substrate. Generally, there are two main technologies in use in contemporary inkjet printing processes: continuous (CD) and drop-on-demand (DOD). Typically, DOD print heads using e.g. piezoelectric crystals are used to eject the droplets out of the nozzle orifice on to the substrate. Digital printing techniques improve the applicability of printing processes and allow for a higher degree of flexibility with respect to the print patterns that can be applied on the substrate. Another advantage of using digital printing techniques, as compared to analogue printing, is that the print pattern can be adapted according to the preferences of a client.

The process term "chemically embossing" is known in the art and based on the principle that the foaming degree of a foamable layer is influenced locally by means of a so-called "foam inhibiting agent". The foam inhibiting agent can be deposited onto the foamable layer by means of a printing technique, preferably by digital printing. The effectiveness of inhibition depends on the permeability, solubility and diffusion speed and distance of the foam inhibiting agent into the foamable layer. A wide range of compounds may be employed to act as inhibitors for chemical embossing of foamable layers in floor covering surfaces. The choice of an inhibiting agent depends on the particular blowing agent utilized in the foamable layer. Triazole compounds such as benzotriazole (BTA), tolyltriazole (TTA) and derivatives and/or combinations thereof can conveniently be used as a foam inhibiting agent for the chemical embossing of a foamable material comprising azodicarbonamide as blowing agent, and ZnO as kicker. A preferred foam inhibiting agent is 1H-Benzotriazole-1-methanamine, N,N-bis(2-ethylhexyl) ar-methyl (CAS 94270-86-7). The foam inhibiting agent is preferably present in a liquid carrier which allows better control of the amount of inhibitor to be applied. Preferably, the foam inhibiting agent is present in the carrier at a concentration of from 1 to 20 wt. % of total weight of the digitally printed material, more preferably in an amount of from 7 to 15 wt. %, and again more preferably of from 9 to 12 wt. %. The material comprising the foaming inhibiting agent may comprise a binder material that allows at least a partial cure after printing the dots, to avoid that the dots spread out and to permit deposition of additional (stacked) dots directly thereafter, while at the same time reducing possible defects. More preferably the binder material is radiation-curable, preferably UV-curable. In order to obtain high flexibility and good adhesion, the binder material preferably comprises an acrylate. Preferably, the acrylate comprises isobornyl acrylate (CAS 5888-33-5), dipropylene glycol diacrylate (CAS 57472-68-1), or combinations thereof. More preferably, the digitally printed material comprises of from 10 to 30 wt. % of isobornyl acrylate, and of from 5 to 30 wt. % dipropylene glycol diacrylate. The material comprising the foam inhibiting agent may further contain a UV-initiator, preferably in an amount of from 1 to 10 wt. %, based on total weight of the digitally printed material. A highly preferred UV initiator is trimethylbenzoyldiphenyl phosphine Oxide (TPO), known under CAS 75980-60-8. In any case, whether the material comprising the foam inhibiting agent is radiation cured or physically dried, it was found that the foam inhibiting material penetrates into the foamable layer after printing, as evidenced by the indentations formed upon foam expansion at locations where dots of digitally printed foam inhibiting material had been deposited. Further, a particular advantage of the subject invention resides in the fact that several dots of inhibitor material can be printed on the same location, resulting for instance in a higher local amount of inhibitor in the foamable layer, and, hence, a stronger reduction of foam formation. In this way higher height differences in the relief can be achieved at very specific locations, allowing for instance for a more natural appearance of the decor of e.g. pronounced wooden or porous stone images. Yet further, the amount of foam inhibiting agent needed to achieve maximum height difference is lower than with conventional (rotogravure) printing, thereby reducing the total amount of foam inhibiting agent required. At the same time, the resolution of the chemically embossed areas could be increased commensurate to the resolution of the digital printing technique.

The term "embossing" as referred herein is known in the art and based on the principle that a portion of the surface of material is shaped into structures both visible and non-visible to the human eye. The embossing is perceived as structural elements (facets, features) and as light scattering. Three levels of structure can be defined: macrostructure has shapes that are 50 micron or greater and can be seen by the human eye, micro-structure is less than 50 micron but larger than 1 micron and is hard to see or is invisible, and light scattering structure which is less than 1 micron and is usually not visible except as a gloss.

Figure 4:
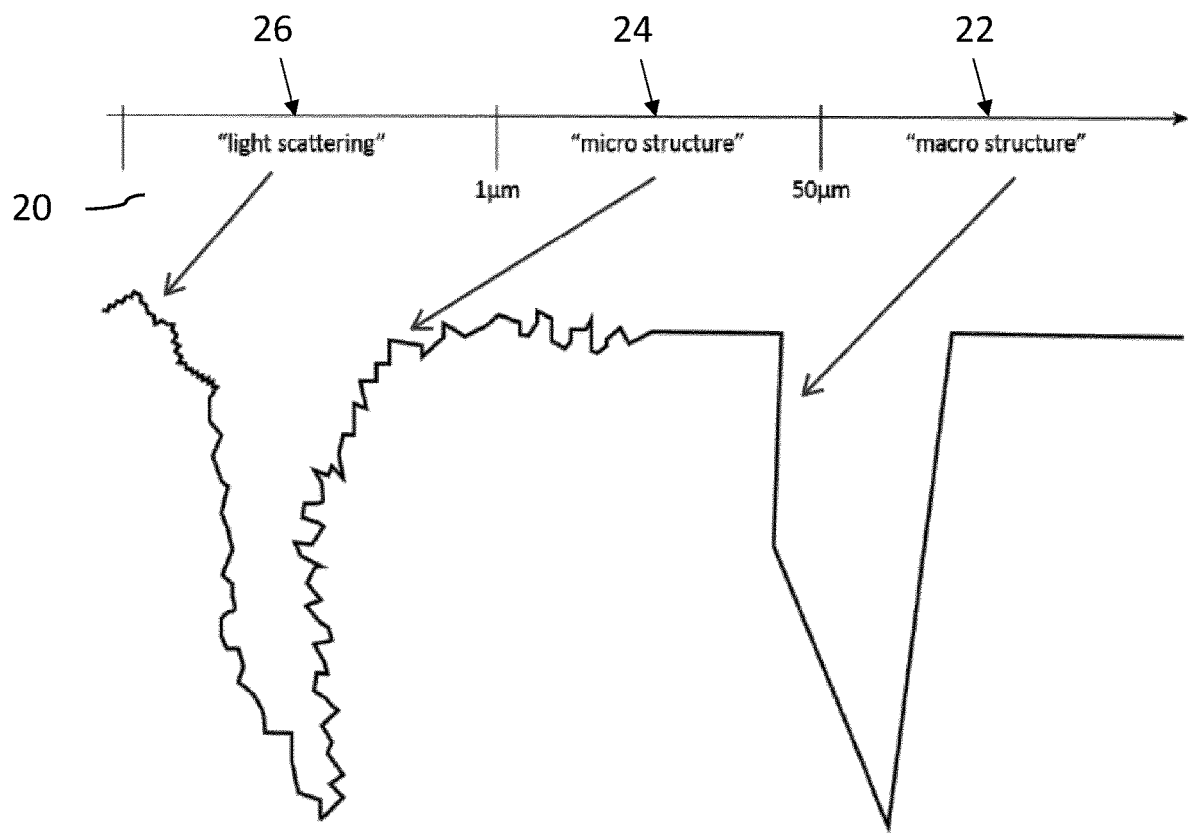
FIG. 4 shows differing levels of surface structure as used in some embodiments of the present invention. These differing levels can be present in an embossed wear-resistant layer.

These three levels of structure are shown schematically in FIG. 4.

"Mechanical embossing" as referred herein is known in the art and based on the principle that a portion of the surface of material is shaped by means of a so called embossing mould.

The term "transparent" as used herein is meant to designate a material which largely transmits visible light.

DETAILED DESCRIPTION OF THE INVENTION

The present invention relates to floor panels, such as planks or tiles, which can optionally be assembled together for example by mechanical connections. The floor panel can have or be dimensioned to any suitable length and/or width and can be provided in any shape, such as a rounded shape and a polygonal shape (triangle, rectangle, square, pentagon, hexagon, heptagon or octagon). Preferably, the floor panel is rectangular, with short sides having a width of from 10 cm to 120 cm, and long sides having a length of from 50 cm to 300 cm. Alternatively, the floor panel is provided in the shape of a square (tile) with a side length of from 20 cm to 150 cm. The floor panels can have a surface with various zones which can reflect light, or scatter light, and can have any of, or any combination of, macroscale, microscale and nanoscale surface structures. One or more of these zones can be aligned with a digital print on a decor layer substrate (1) and a multi-layered top layer (2) comprising a decor layer (3), a print pattern (4), a wear-resistant layer (5), and optionally a lacquer layer (6) directly on top of the wear-resistant layer. The lacquer layer can be a continuous or discontinuous, transparent layer that conforms to mechanically and/or chemically embossed relief patterns to which it is applied.

Figure 3:
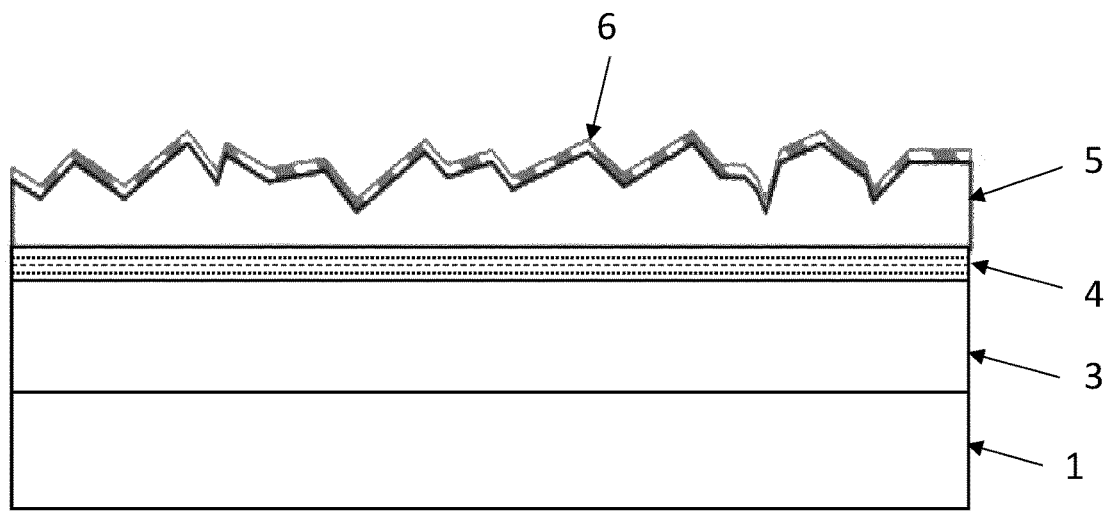
FIG. 3 is a cross-sectional drawing of a product according to embodiments of the present invention.

As shown in FIGS. 1 and 3 according to a first aspect, the present invention provides a floor panel comprising:
- a substrate (1);
- a multi-layered top layer (2) directly attached to the substrate (1);
- whereby the multi-layered top layer (2) comprises:
- a decor layer (3) comprising a fused PVC plastisol,
- a print pattern (4) deposited as single or stacked dots of a digitally printed material on top of the decor layer (3),
- a wear-resistant layer (5) comprising a fused PVC plastisol provided above the print pattern (4), and
- optionally, a lacquer layer provided directly on top of the wear-resistant layer.

It is preferred if the substrate 1 is a single layer. It is preferred if the substrate is made of PVC.

FIG. 3 shows how the lacquer layer can be a conformal layer i.e. the lacquer layer has the same thickness at all points on the wear-resistant layer. This has the advantage that any relief pattern in the wear-resistant layer and/or the decor layer will be telegraphed through to the lacquer layer. This allows the upper surface of the floor panel to have nanoscale, microscale and macroscale features. Also, the lacquer layer may show differing gloss levels that can be located at any part of the macroscale or microscale features of the wear-resistant layer. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

FIG. 4 shows differing levels of surface structure as used in some embodiments of the present invention. These differing levels can be present in an embossed wear-resistant layer.

Figure 5A:
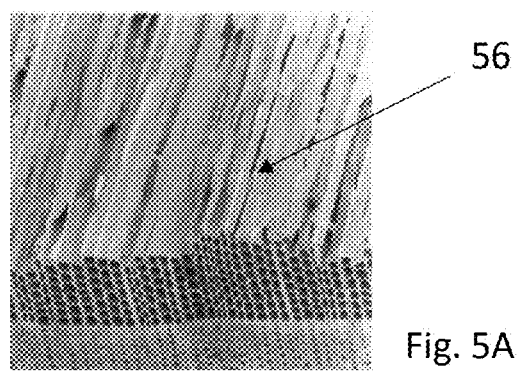
FIGS. 5A to F show various natural surfaces which can include any of and any combination of macroscale, microscale and nanoscale features which can be replicated by methods of the present invention.
Figure 5B:
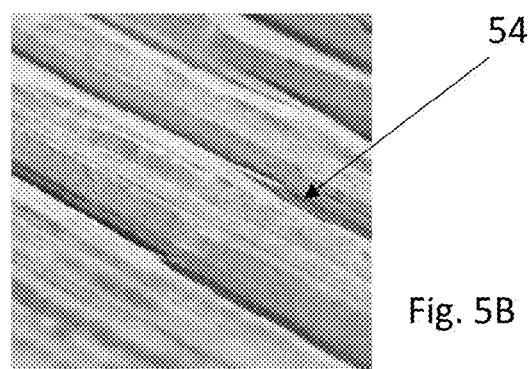
Figure 5C:
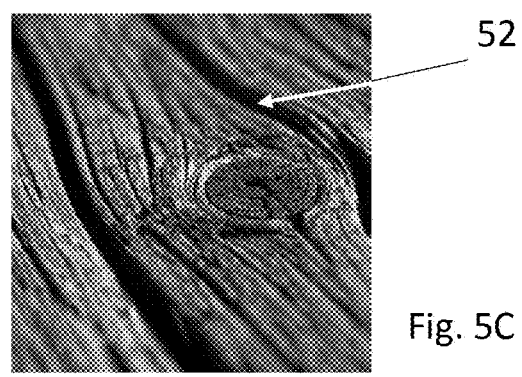
Figure 5D:
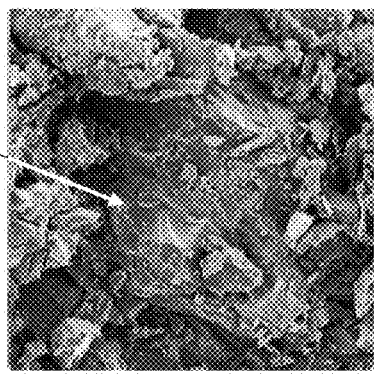
Figure 5E:
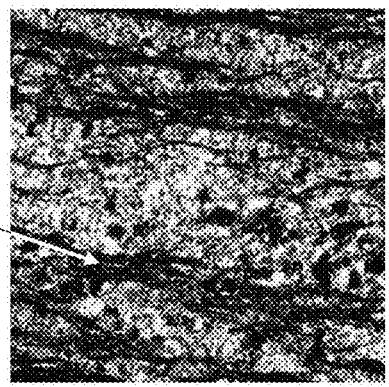
Figure 5F:
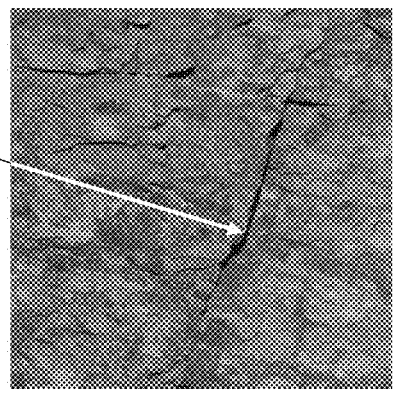

FIG. 5 shows differing levels of surface structure in natural products like wood (FIG. 5A-C) and stone (FIG. 5D-F)

FIGS. 4 and 5 illustrate macroscale (22 in FIGS. 4 and 52 in FIG. 5C and 51 in FIG. 5F), microscale (24 in FIGS. 4 and 54 in FIG. 5B and 53 in FIG. 5E) and nanoscale features (26 in FIGS. 4 and 56 in FIG. 5A and 55 in FIG. 5D). Examples shown in these figures of macroscale features present in some natural products are narrow and deep. An example is a macroscale groove 22 in FIG. 4 similar to natural wood groove 52 in FIG. 5C that can be present on some cut wood samples and slate groove 51 in FIG. 5F. These shapes can be generated by the moulding technique of the present invention because the embossing can be formed into the wear-resistant layer (5) while the layer during gelling. Hence, little pressure is required so that tall thin features on the mould are not likely to break. Also, as shown in FIG. 4 nanoscale (26) or microscale (24) features can be placed at any position on the macroscale features (22). Nanoscale features can exhibit gloss and, hence, various different glosses may be placed at any position of the macroscale features.

The inventors have found that by providing a flexible, multi-layered top layer onto a rigid substrate, it is possible to minimize the curling and to provide a curling-free floor panel.

This is especially the case when the ratio between elastic moduli of the substrate and multi-layered top layer is at least 20, preferably in the range of 20 to 10000, more preferably in the range of 20 to 1000, and even more preferably in the range of 20 to 500 measured at 23±2° C. and 50±10% R.H. according to ISO 527. ISO 527 "Plastics—Determination of tensile properties" consists of several parts, of which the following are relevant for the purpose of the present invention.

Part 1, ISO 527-1:2012 "General Principles" specifies the general principles for determining the tensile properties of plastics and plastic composites under defined conditions. Several different types of test specimen are defined to suit different types of material which are detailed in subsequent parts of ISO 527.

Part 2, ISO 527-2:2012 "Test conditions for moulding and extrusion plastics" specifies the test conditions for determining the tensile properties of moulding and extrusion plastics, based upon the general principles of Part 1.

Part 3, ISO 527-3:2018 "Test conditions for films and sheets" specifies the conditions for determining the tensile properties of plastic films or sheets less than 1 mm thick, based upon the general principles given in ISO 527-1.

All test specimens were cut or punched to the dimensions of specimen type 1B. The test speed of the tensile-testing machine was maintained at 1 mm/min.

The relevant parts of ISO 527 are used depending on the type and/or thickness of the parts (substrate and multi-layered top layer) of the floor panel.

Substrate

The substrate may comprise one or more layers. The substrate has a first upper surface and a first bottom surface. In a preferred embodiment and, optionally, for all embodiments, the substrate consists of a single layer. The substrate may be made of synthetic material or composite material, such as stone-plastic composites (SPC) and wood-plastic composites (WPC), which optionally may be foamed. Stone-plastic composites may comprise calcium carbonate (limestone), polyvinyl chloride and plasticizers. Wood-plastic composites typically comprise thermoplastic materials and wood-like or wood materials such as wood flour. The substrate may also be made of wood or wood-based material, such as a fiberboard or a particle board.

In a preferred embodiment, the substrate comprises polyvinyl chloride. In a more preferred embodiment, the substrate comprises polyvinyl chloride and consists of a single layer. The polyvinyl chloride used to form the substrate may be a powder compound that is easy to process, has high extrusion rate, good surface properties, excellent dimensional stability, and indentation resistance. Also, high and uniform porosity of the resin particles is preferred to optimize compounding and processing aspects, including the fast and uniform absorption of any stabilizer that is present as well as other ingredients during compounding. The polyvinyl chloride may be a suspension polymerization grade or mass polymerization grade polymer resin having a preferred molecular weight as reflected by its K-value. In a preferred embodiment, the substrate comprise polyvinyl chloride with a K-value between 50 and 80, and more preferably between 55 and 70. The polyvinyl chloride preferably has a narrow molecular weight distribution and narrow particle size distribution in order to provide a good balance between processability and material properties. The polyvinyl chloride is preferably a suspension PVC. It was observed that lower K-values are preferred for foamed substrates.

The substrate preferably comprises at least one filler or filler source. The filler is used to optimize the mechanical properties and reduces the material cost of the substrate. The filler source may include virgin materials but may also include post-industrial recycled or post-consumer recycled materials such as gypsum, glass, energy by-products, wood, plastic (e.g. PVC), recycled panels or parts thereof, and the like, or all of these. The filler can be a natural filler or a synthetic filler. The filler can be in the form of particles, short fibres, flakes, and other discrete forms. Inorganic filler (such as mineral fillers) as well as organic (non-mineral) fillers may be used. Examples of inorganic filler include, but are not limited to, hydrated alumina, magnesium carbonate, calcium carbonate, calcium sulfate, silica, precipitated silica, fumed silica, fly ash, cement dust, glass, clay, chalk, limestone, marble, talc, mica, barium sulfate, silicates, aluminium trihydrate, kaolin, wollastonite, gypsum, solid or hollow glass microspheres, and the like. Examples of non-mineral or organic filler include, but are not limited to, carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based substrate, or other types of substrate panels.

In a preferred embodiment, the filler is chosen from the group consisting of calcium carbonate, magnesium carbonate, talc, chalk, wollastonite, mica, and combinations thereof.

In another preferred embodiment, said substrate comprises a filler material that increase the elastic modulus of the substrate, said filler material being comprised predominantly of a mixture of talc and chalk. Said high elasticity modulus corresponds to a high rigidity and thermal stability of the obtained panel.

Filler may be present in the substrate in an amount from 10 wt. % to 85 wt. %, based on the total weight of the substrate. In some embodiments, filler may be present in an amount from 20 wt. % to 80 wt. % based on the total weight of said substrate. In other embodiments, filler may be present in an amount from 40 wt. % to 80 wt. % based on the total weight of said substrate. In yet other embodiments, filler may be present from 30 wt. % to 60 wt. % based on the total weight of said substrate.

The substrate may comprise one or more plasticizers. The one or more plasticizers are present in the substrate in an amount of less than 15 wt. %, based on the total weight of said substrate. More preferably, said one or more plasticizers are present in an amount of less than 10 wt. %, even more preferably less than 5 wt. %, based on the total weight of said substrate, and even more preferably, in an amount of less than 2 wt. %. This is advantageous, because a reduced amount of plasticizers provides a substrate with high elasticity modulus, high rigidity and high thermal stability.

The substrate may also include pigments, flame retardants, antimicrobial additives, processing aids, stabilizers, impact modifiers, or other conventional organic or inorganic additives commonly used in polymers used in the field of surface coverings.

In a preferred embodiment, the substrate according to current invention does not comprise a reinforcement layer.

In a preferred embodiment, the substrate is a foamed substrate, preferably a rigid, foamed substrate. Desirably, the foamed substrate comprises synthetic foam, which is a foam composition with a polymeric continuous matrix material and filler material. Suitable polymeric foams include extruded polymeric foam, expanded polymeric foam, free rise or restrained rise liquid dispensed polymeric foam, and moulded polymeric foam. The foam may comprise, and desirably comprises as a continuous phase, a thermoplastic polymer matrix material or a thermoset polymer matrix material, or mixtures thereof. Also, for determining the tensile properties of a foamed substrate, preferably a rigid, foamed substrate, ISO 527 is used.

In a preferred embodiment, the substrate is a rigid, foamed substrate comprising PVC.

The density of the substrate, typically, is selected depending on the particular application. Preferably, the density of the substrate is equal to or less than about 1600 $kg/m^3$, more preferably less than about 1400 $kg/m^3$, even more preferably less than about 1300 $kg/m^3$. Preferably the density is equal to or more than about 400 $kg/m^3$, more preferably more than about 600 $kg/m^3$, even more preferably more than about 800 $kg/m^3$, and most preferably more than about 1000 $kg/m^3$. In preferred embodiments, the density of the foamed substrate is from 1050 $kg/m^3$ to 1300 $kg/m^3$, more preferably from 1100 $kg/m^3$ to 1200 $kg/m^3$.

In a preferred embodiment according to the first aspect, the substrate has a thickness of 1 mm to 25 mm. Preferably, the substrate has a thickness of 1.5 mm to 20 mm, and more preferably of 1.5 mm to 7 mm, and even more preferably between 2.4 mm to 5.8 mm.

In a preferred embodiment according to the first aspect, the substrate is rigid. The term "rigid" in the context of the present invention refers to a characteristic of a substrate with an E-modulus of more than 2000 MPa measured at 23±2° C. and 50±10% R.H., according to ISO 527, and (if applicable) a glass transition temperature ($T_g$) of 70° C. or higher, measured according to ISO 6721-11:2019(E) Method B with a heating rate of 2 K/min and a test frequency of 1 Hz. Preferably, said substrate has an E-modulus of 2000 to 4000 MPa or 4000 MPA or higher. An E-modulus of 2000 or 4000 MPA up to 8000 MPa can be obtained. For example, by using an optimized amount of a filler such as an inorganic filler e.g. talc and chalk, a substrate comprising PVC with an E-modulus up to 8000 MPa can reasonably be achieved. Preferably, said substrate has (if applicable) a glass transition temperature ($T_g$) of 80° C. or higher and more preferable a glass transition temperature ($T_g$) of 85° C. or higher. The transition temperature ($T_g$) is determined using the temperature of the peak in the respective DMA curves of loss factor (tan delta) vs. temperature.

Multi-Layered Top Layer

According to the first aspect of the invention, the multi-layered top layer comprises:
 a decor layer comprising a fused PVC plastisol,
 a print pattern deposited as single or stacked dots of a digitally printed material on top of the decor layer,
 a wear-resistant layer comprising a fused PVC plastisol provided above the print pattern
 optionally, a lacquer layer provided directly on top of the wear-resistant layer.

Multi-layered top layer has a second upper surface and a second bottom surface. The multi-layered top layer may have a thickness of 0.15 mm to 1.7 mm. Preferably, the multi-layered top layer has a thickness of 0.3 mm to 1.5 mm, and more preferably of 0.4 mm to 1.3 mm, and most preferably a thickness of 0.5 mm to 1.2 mm.

In a preferred embodiment according to the first aspect, the multi-layered top layer is a flexible layer that does not comprise a reinforcement layer. The term "flexible layer" in the context of the present invention refers to a multi-layered top layer with an E-modulus of 100 MPa or lower measured according to ISO 527. The glass transition temperature ($T_g$) can be 45° C. or lower, measured according to ISO 6721-11:2019(E) Method B with a heating rate of 2 K/min and a test frequency of 1 Hz. Preferably, said multi-layered top layer has an E-modulus in the range of 20 MPa to 100 MPa. Preferably, said multi-layered top layer has a glass transition temperature ($T_g$) of 40° C. or lower and more preferable a glass transition temperature ($T_g$) of 35° C. or lower. The transition temperature ($T_g$) is determined using the temperature of the peak in the respective DMA curves of loss factor (tan delta) vs. temperature.

The inventors have found that the multi-layered top layer according to embodiments of the present invention shows good adherence to the substrate without necessarily requiring a separate adhesive or glue. The first upper surface of the substrate is preferably in direct contact with the second bottom surface of the multi-layered top layer.

The floor panel is therefore preferably free of interlayer adhesive material that binds the substrate and the multi-layered top layer together. This is especially the case when the multi-layered top layer is attached directly to a substrate comprising PVC.

The resistance against separation of the substrate and the multi-layered top layer by peeling was found to be at least 50 N/50 mm, more preferably at least 100 N/50 mm, and even more preferably at least 200 N/50 mm. The peel strength is determined according to the following peel test. The peel test is conducted with a tensile testing machine comprising a peel test fixture similar to the one described in EN1464:2010(E). The tensile testing machine should be capable of maintaining a pre-determined constant crosshead rate, preferably of 100 mm/min. The test sample is conditioned in a laboratory atmosphere at a temperature of 23° C. and relative humidity of 55% RV for 7 days. Three test pieces of 280 mm by 50 mm are taken from the test sample. The initial separation of the multi-layered top layer and the substrate over 50 mm is initiated by a cutter knife and/or pliers. The unbound end of the flexible multi-layered top layer is bent perpendicular to the rigid substrate for clamping in the grip of the testing machine. The test piece is placed horizontally into the peel test fixture, with the unbound end of the flexible multi-layered top layer oriented downwards and gripped in the jaw of the testing machine. The test piece is peeled at a constant crosshead separation rate of 100+/−5 mm/min. The crosshead is stopped after peeling 200 mm of the bonded length. From the autographic curves of the three samples, which display force versus crosshead movement, the average peeling resistance is determined in Newton per 50 millimeter of the test piece. The first 50 mm and the last 50 mm of the peeling are disregarded in the determination of the average peeling resistance.

Decor Layer

The decor layer preferably comprises a fused PVC plastisol. The decor layer has a third upper surface and a third bottom surface. The third bottom surface can be the same as the second bottom surface of the multi-layered top layer. Hence, the third bottom surface of the decor layer can be in direct contact with the first upper surface of the substrate. In a preferred embodiment, the decor layer comprises polyvinyl chloride with a K-value between 50 and 75, and more preferably between 55 and 70. The decor layer preferably comprises an emulsion-PVC grade or a microsuspension-PVC grade with a K-value between 50 and 75, and more preferably between 55 and 70.

The decor layer may further include one or more additives known in the art, such as fillers, pigments, blowing agents, and stabilizers.

The decor layer may comprise one or more fillers. Filler may be present in an amount from 15 wt. % to 60 wt. %, based on the total weight of the decor layer. In some embodiments, filler may be present in an amount from 15 wt. % to 50 wt. % based on the total weight of decor layer. In other embodiments, filler may be present in an amount from 15 wt. % to 45 wt. % based on the total weight of the decor layer. Suitable fillers for the decor layer are the fillers described herein for the substrate.

In a preferred embodiment, the filler is chosen from the group consisting of calcium carbonate, magnesium carbonate, talc, chalk, wollastonite, mica, and combinations thereof. In another preferred embodiment, said decor layer comprises a filler material, said filler material being comprised predominantly of a mixture of talc and chalk.

In a preferred embodiment the decor layer comprises one or more plasticizers. The one or more plasticizers may be present in an amount between 10-35 wt. %, based on the total weight of the decor layer. More preferably, said one or more plasticizers are present in an amount between 10-30 wt. %, even more preferably between 10-25 wt. %, based on the total weight of the decor layer.

The decor layer may comprise pigments or colorants, either uniformly or non-uniformly distributed in the layer. The pigments or colorants may provide a base color to the decor layer. Titanium dioxide may for instance be used as a white pigment.

In a preferred embodiment according to the first aspect, the decor layer has a thickness of 0.10 mm to 0.70 mm, and preferably of 0.25 mm to 0.60 mm.

Print Pattern

The multi-layered top layer comprises a print pattern deposited as single or stacked dots of a digitally printed material on top of the decor layer. The print pattern is preferably printed using inkjet printing. The print pattern preferably comprises digitally printed dots of ink forming a decorative image with a resolution in the range of from 100 to 4800 dpi, preferably of from 400 to 800 dpi. The print pattern may be deposited using so-called black, cyan, magenta and yellow inks. The ink typically includes a liquid vehicle and one or more solids, such as dyes or pigments and polymers. UV-curable inkjet printable inks were found to be particularly useful. The ink preferably comprises one or more photo-initiators in a suitable amount and suitable decomposition absorption spectrum.

Wear-Resistant Layer

A wear-resistant layer comprising a fused PVC plastisol is provided above the printed pattern. Preferably, the wear-resistant layer is provided over the majority of the surface of the printed decor layer, and more preferably over the entire surface of the printed decor layer. The wear-resistant layer is at least translucent, preferably transparent and applied to protect the floor panel from wear and tear. The thickness of this wear-resistant layer is preferably from about 0.10 mm to about 1.00 mm, and more preferably from about 0.10 mm to about 0.70 mm, and most preferably from 0.20 to 0.70 mm.

In a preferred embodiment, the wear-resistant layer comprises polyvinyl chloride with a K-value between 50 and 95, and more preferably between 60 and 85. The polyvinyl chloride comprises preferably a microsuspension-PVC grade or an emulsion-PVC grade or a mixture of both.

The wear-resistant layer may include one or more additives known in the art, such as plasticizers, filler, pigments, wear-resistant particles, cross-linking agents, and UV stabilizers. The wear-resistant layer may comprise one or more plasticizers. The one or more plasticizers may be present in an amount between 10 wt. % to 35 wt. %, based on the total weight of the wear-resistant layer.

In a one embodiment, the wear-resistant layer does not comprise a filler.

Lacquer

A finishing top coat or lacquer may optionally be provided directly onto the top surface of the wear-resistant layer. The lacquer improves the scratch resistance of the floor panel. This lacquer can be a thermoset layer or a thermoplastic layer. The lacquer can be, for example, a water-based, solvent-based, radiation-curable, non-radiation curable, UV-curable or non-UV-curable system. For example, the lacquer can be comprised of acrylics, acrylates, urethanes, epoxies, other types vinyl, other type polymers, and blends thereof, as long as the composition when cured, results in a rigid, thermoset coating with adequate cross-link density. The lacquer may comprise fillers and other additives, for instance to improve the scratch resistance properties.

The lacquer layer can be a conformal layer i.e. the lacquer layer has the same thickness at all points on the wear-resistant layer. This has the advantage that any relief pattern in the wear-resistant layer and/or the decor layer will be telegraphed through to the lacquer layer. The lacquer layer can be applied as a continuous or discontinuous, transparent layer that conforms to mechanically and/or chemically embossed relief patterns to which it is applied.

In a highly preferred embodiment, the floor panel according to the present invention comprises:
  a substrate comprising PVC,
  a multi-layered top layer directly attached to the substrate; whereby the multi-layered top layer comprises:
  a decor layer comprising a fused PVC plastisol,
  a print pattern deposited as single or stacked dots of a digitally printed material on top of the decor layer,
  a wear-resistant layer comprising a fused PVC plastisol provided above the print pattern
  optionally, a lacquer layer provided directly on top of the wear-resistant layer.

The inventors have found that the multi-layered top layer according to the invention shows exceptionally good adherence to a substrate comprising PVC without requiring a separate adhesive or glue to bind the top layer to the substrate, and has excellent dimensional stability without the need to incorporate one or more reinforcement layers in either the substrate and/or top layer. The lacquer layer can be a continuous or discontinuous, transparent layer that conforms to mechanically and/or chemically embossed relief patterns to which it is applied. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

The floor panel may consist of:
  a substrate comprising PVC;
  a multi-layered top layer directly attached to the substrate; whereby the multi-layered top layer comprises:
  a decor layer comprising a fused PVC plastisol,
  a print pattern deposited as single or stacked dots of a digitally printed material on top of the decor layer,
  a wear-resistant layer comprising a fused PVC plastisol provided above the print pattern, and
  optionally, a lacquer layer provided directly on top of the wear-resistant layer. The lacquer layer can be a continuous or discontinuous, transparent layer that conforms to mechanically and/or chemically embossed relief patterns to which it is applied.

Further Embodiments

In one embodiment, the decor layer is a foamed decor layer. A foamed decor layer may be achieved by incorporating one or more blowing agent(s) into the plastisol PVC coating, and by allowing the decor layer to expand at elevated temperature. The foamed decor layer may have a sponge or foam structure that has a lower bulk density than a non-foamed decor layer. The foamed decor layer primarily provides optimized cushioning and acoustic characteristics of the floor panel.

The foamed decor layer may exhibit a chemically embossed relief pattern. The chemically embossed relief pattern comprises indentations formed by single or stacked dots of digitally printed material comprising a foam inhibiting agent. By stacking the printed foam inhibiting agent, higher height differences in the relief can be achieved at specific locations, allowing for instance for a more natural appearance of decors comprising pronounced wooden or porous stone images. Yet further, the amount needed to achieve maximum height difference is lower than with conventional (rotogravure) printing, thereby reducing the total amount of foam inhibiting agent required. The resolution of the chemical embossed relief pattern is preferably in the range of from 100 to 1200 dpi, more preferably of from 300 to 1000 dpi even more preferably between 360 and 600 dpi.

The digitally printed material containing the foam inhibiting agent may optionally comprise ink. Ink and foam inhibiting agent can be co-deposited, so the ink pattern typically follows the relief pattern.

In a preferred embodiment, the digitally printed material containing the foam inhibiting agent is free from ink. Separate or side-by-side printing of the inhibiting agent and the ink allows for effective uncoupling of the relief pattern and the decorative ink pattern. The location and depth of the chemical embossed relief may then be chosen independently from the printed ink pattern. This provides the designer more design freedom, allowing to create color gradients and structures, with a high resolution of both the relief and the decor, while reducing or even avoiding repetition.

The wear-resistant layer may comprise a mechanically embossed surface structure, which may be in the form of a relief pattern. The mechanical embossed surface structure typically comprises microscale and nanoscale features. The microscale features have a feature depth in the range of 1 to 50 micrometer. The nanoscale features have a feature depth that is smaller than 1 micrometer. The features discussed herein are predetermined, that is features that are intentionally imparted wear-resistant layer by means of the embossing process rather than merely the features that are inherently present on a surface due to the natural topography of the surface, surface contamination, and the like. The micro- and nanoscale features influence the haptic and aesthetic properties of the floor panel. The nanoscale features are invisible but scatter visible light and are therefore perceived as a gloss.

In a preferred embodiment, the floor panel comprises a mechanically embossed surface structure comprising deviating micro- and nanoscale features, leading to zones with different topography and different levels of gloss. Gloss is characterized by directional reflection of incident light, and also called specular reflection. In accordance with ISO2831 the level of gloss may be determined by measurement using a reflectometer. A reflectometer emits a beam of light at a predetermined angle of incidence onto the surface for testing and receives the beam of light reflected by the surface. The ratio of light intensity between the emitted and the received beams of light characterizes the level of gloss of the surface. The level of gloss is categorized into steps ranging from high gloss (20° angle of incident, 60% to 70% reflection) through glossy (60°, 55% to 65%), silk gloss (60°, 25% to 35%), silk matt (85°, 40% to 50%), to matt (85°, 6% to 8%).

In a preferred embodiment, the floor panel of the invention has at least two zones with different gloss levels. The floor panel may for instance have first with high gloss, a second zones with silk gloss, and third zones with matt.

The amount and angular distribution of reflective scatter from a surface can be determined by bidirectional reflectance distribution function (BRDF) measurements (ASTM E 2387-05 Standard Practice for Goniometric Optical Scatter zones Measurements").

In a preferred embodiment, the floor panel of the invention has macro, micro, and nanoscale features.

FIG. 4 shows differing levels of surface structure as used in some embodiments of the present invention. These differing levels can be present in an embossed wear-resistant layer.

"The First Level—Nanoscale Features"

All materials have a light scattering structure the light scattering can be represented as a combination of any of the following types of gloss and scattered light: specular gloss, broad gloss, diffuse scatter and any or all of these can be aligned with a colour pattern provided by the print pattern on the decor layer. The way the light is reflected back as gloss or scatter depends on the structure of the surface. There can be many zones on the surface that have a light scattering structure, not necessarily the same light scattering structure but optionally different ones.

"Second Level Microscale Features"

Most surfaces and plate materials have a combination of light scattering and microstructure. Most of the surface roughness values in standards are in the region of microstructure. For example, most commonly used finishing processes such as sanding with sanding paper will influence the microstructure and light scattering. Microstructure is not visible from a normal viewing distance but can be seen close up or with a magnifying glass. The microstructure will influence the glossiness of a surface, but the resulting glossiness is always a combination of the microstructure and the nanostructure. The microstructure can have angled or sloping features that can influence the direction of light scattering.

"Third Level Macroscale Features"

Most structured surfaces have a combination of light scattering, micro- and macrostructures, although a combination of light scattering and macrostructure can occur. Macrostructure features are usually visibly distinguishable to the naked eye, meaning that it can be recognised as a grain, a slope, a crack, a hole, etc. Macroscale features do not influence the glossiness of the surface but can influence the direction of it. Features like wood knots, wood grains, wood fibres, a hair, a marble vein, etc. are all macroscale features.

For measuring macro- and microstructures a microscope can be used to see micro- and macrostructure. Both optical and contact profilometers can be used to measure micro- and macro structure.

Optical measurements are used for micro- and macrostructures as well.

Surface roughness is usually at the microstructure level (for at least one direction), but can also go to nanostructures, i.e. light scattering structures.

In addition to the micro- and nanoscale features, the wear-resistant layer may also comprise macroscale features, which are visible with the naked eye. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

In one embodiment according to the first aspect of the invention, the multi-layered top layer comprises a decor layer comprising a chemically embossed relief pattern, a print pattern deposited as single or stacked dots of a digitally printed material on top of the decor layer, and a mechanically embossed wear-resistant layer above the printed decor layer.

In a preferred embodiment, the floor panel comprises a surface structure, wherein the macroscale features are primarily imparted by chemical embossing in the decor layer and the micro- and nanoscale features are primarily imparted by mechanical embossing in the wear-resistant layer. This results in a surface structure comprising sharp and fine micro- and nanoscale features of the mechanically embossed wear-resistant layer superimposed on the coarser, more rounded macroscale features of the chemically embossed decor layer. In this way, the natural appearance of the panel can be improved and may even be further improved by full or partial alignment of mechanically embossed surface structure with the decorative print pattern on a decor layer. The inventors found that in this way floor panels with a more realistic look and feel could be provided, which successfully imitate the color, structure, and gloss of wood grain structure.

The floor panel may further comprise coupling parts for assembling several panels together (further referred to as a 'locking system'). Locking systems have been widely used for many years and are well known to the artisan. Most popular locking systems are glueless locking systems where both horizontal and vertical locking of the panels are realized with a tongue along one (edge) side and a groove along the opposite (edge) side of the panel. Typically, tongue and groove locking systems are integrally made with the panel. An alternative locking system comprises a plurality of staggered hooking tongues, extending outwardly from the edges of the panel. Such a system is for example described in EP3129567.

Further, the floor panel may be provided with a bevel along one or more of its side edges. Such bevels are known in the art and may be provided to the floor panel using any method known in the art. Traditionally, the bevel is milled in the finished floor panel at an angle of approximately 30°. The depth of the milling should preferably not extend the thickness of the wear-resistant layer. Deeper milling removes the decorative print and results in an exposure of the underlaying decor layer, which provides an unnatural look to the bevel and, as a result of this, often requires an additional refinishing step. Standard milling processes furthermore create straight edges, which give the bevel a more artificial look. The milling process also removes the lacquer layer that may be present on top of the wear-resistant layer. Removal of the lacquer makes the floor panel more susceptible for scratches and stains and result in a very glossy surface. The lacquer layer can be a continuous or discontinuous, transparent layer that conforms to mechanically and/or chemically embossed relief patterns to which it is applied.

In one embodiment, the floor panel comprises a multi-layered top layer having a foamed decor layer and a chemically embossed bevel along one or more of its side edges. The recess of the bevel is formed where the foaming is inhibited. The amount of foaming inhibiting agent may vary over the width of the bevel to realize a bevel with a specific depth, shape and/or slope. In this way, more design freedom can be achieved.

In another embodiment, the floor panel comprises a multi-layered top layer having a foamed decor layer and one or more chemically embossed grouts or grooves. Further, the chemically embossed grout may be cut or milled through the middle to realize floor two panels with beveled edges.

Another important advantage of an embossed bevel or grout is that the wear-resistant layer and, optionally the lacquer layer on top, are retained in the final product. This results in a superior wear and scratch resistance when compared to a milled bevel. The lacquer layer can be a continuous or discontinuous, transparent layer that conforms to mechanically and/or chemically embossed relief patterns to which it is applied.

Further, the embossed relief pattern may optionally be aligned with the print pattern, which allows to further optimize the aesthetics and natural appearance of the floor panel.

The floor panel may have a backing layer provided adjacent and adhered to the lower surface of the substrate. The backing layer may contain a single layer or multiple layers. The backing layer may be applied for impart nonskid property to a loose-lay floor. The backing layer may comprise a foamed layer, for instance for improving acoustics or providing thermal insulation. The backing layer may be made of synthetic material, for instance extruded polyethylene. In a preferred embodiment, the backing layer comprises polyvinyl chloride. The PVC backing layer may be provided as an extruded layer or as one or more fused plastisol layers.

Method of Producing Floor Panels

In a second aspect, the present invention provides a method of producing a floor panel according to the first aspect of the invention, comprising the subsequent steps of:
S1: providing a substrate,
S2: applying a first coating comprising a PVC plastisol directly onto the substrate to obtain a decor layer,
S3: gelling the decor layer,
S4: applying a print pattern of single or stacked dots of printing material directly onto the gelled decor layer by means of digital printing,
S5: applying a second coating comprising a PVC plastisol onto the printed decor layer to obtain a wear-resistant layer,
S6: gelling the wear-resistant layer and fusing the decor layer and wear-resistant layer,
S7: optionally, applying a lacquer layer directly on top of the fused wear-resistant layer.

The multi-layered top layer according to the first aspect of the invention is created in steps S2 to S7. The optional lacquer layer can be a conformal layer, i.e. having the same thickness at all points on the wear-resistant-layer. This allows any relief pattern in the wear-resistant layer and/or décor layer to be telegraphed through to the lacquer layer. The optional lacquer layer preferably conforms to underlying macroscale, microscale or nanoscale surface relief patterns. The lacquer layer can be applied as a continuous or discontinuous, transparent layer that conforms to mechanically and/or chemically embossed relief patterns to which it is applied. As the lacquer layer is transparent, the appearance of the floor panel can be determined by the lacquer layer, the wear-resistant layer and the digital print on the decor layer. Further, the appearance of a gloss or glosses from the wear-resistant layer can be combined with a gloss or glosses from the lacquer layer.

Figure 2:
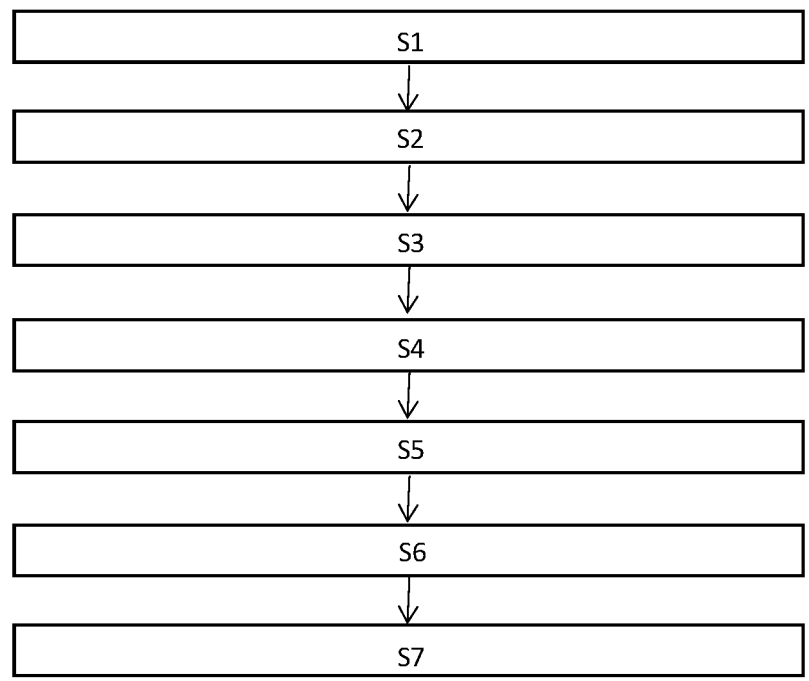
FIG. 2 is a schematic representation of a method according to the second aspect of the invention for producing a floor panel comprising the subsequent steps of (S1) providing a substrate, (S2) applying a first coating comprising a PVC plastisol directly onto the substrate to obtain a decor layer, (S3) gelling the decor layer, (S4) applying a print pattern of single or stacked dots of printing material onto the decor layer by means of digital printing, (S5) applying a second coating comprising a PVC plastisol onto the printed decor layer to obtain a wear-resistant layer, (S6) gelling the wear-resistant layer and subsequently fusing the decor layer and wear-resistant layer, (S7) applying a lacquer layer directly on top of the fused wear-resistant layer. The lacquer layer can be a conformal layer. The lacquer layer can be a continuous or discontinuous, transparent layer that conforms to mechanically and/or chemically embossed relief patterns to which it is applied.

FIG. 2 shows a schematic representation of a process according to the second aspect of the invention for producing a floor panel.

In the first step (S1), a substrate as described herein is provided, which can for instance be a substrate made of synthetic or composite material. In a subsequent step (S2), a first coating comprising a PVC plastisol as described herein is applied directly onto the substrate to obtain a decor layer. PVC plastisol coatings can be applied by a various of application methods, such as roller coating or spray coating. In a preferred embodiment, the plastisol is applied by roller coating. The decor layer is then gelled at a temperature in the range of 50° C. to 160° C., preferably at 150° C. in an IR oven (S3). In a following step (S4), a print pattern of single or stacked dots of printing material is applied directly onto the gelled decor layer by means of a digital printing technique, preferably by inkjet printing. The print pattern is preferably applied to a flat decor layer with an appropriate surface temperature and surface energy for printing. The surface of the decor layer is ideally at ambient temperature. In a preferred embodiment, the printing material is an UV-curable ink applied by inkjet printing. After applying droplets of ink in a desired pattern with the inkjet printer, the droplets are preferably at least partially cured using UV light. This will prevent further spreading of the droplets over the decor layer and allows a rapid fixation of the print on the gelled decor layer. This allows a fast and accurate printing of the decor layer. In another embodiment, the print pattern is applied using laser printing. Similar as using inkjet printing in combination with UV-curable inks, laser printing will allow a rapid fixation of the print on the gelled decor layer. In the present process, any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-410 nm, more preferably an ultraviolet LED. Yet more specifically, a UV-A light source, more preferably a UV-A LED is preferred due to the reduced light scattering therewith resulting in more efficient, in-depth curing. In a following step (S5), a second coating comprising a PVC plastisol is applied onto the printed decor layer to obtain a wear-resistant layer. Preferably, the plastisol coating is applied by a roller coating machine. In a subsequent step (S6), the wear-resistant layer is gelled at a temperature in the range of 60° C. to 160° C. and, subsequently, the decor layer and wear-resistant layer are fused for at a temperature in the range of 160° C. to 200° C. The gelling and fusing process may for instance performed in a convection oven. Optionally, a lacquer layer as described herein can be applied directly on top of the fused wear-resistant layer (S7). The application of a lacquer for floor panels is well known in the art. The optional lacquer layer can be a conformal layer, i.e. having the same thickness at all points on the wear-resistant layer. This allows any relief pattern in the wear-resistant layer and/or decor layer to be telegraphed through to the lacquer layer. The optional lacquer layer preferably conforms to any underlying embossed surface features. The lacquer layer can be applied as a continuous or discontinuous, transparent layer that conforms to mechanically and/or chemically embossed relief patterns to which it is applied.

Foaming of the Decor Layer

In a preferred embodiment, the first coating containing a PVC plastisol is provided with one or more blowing agents to obtain a foamable decor layer. Foaming is initiated through thermal treatment during the fusing step (S6).

In further preferred embodiment, the foamable decor layer is foamed and chemically embossed during the fusion step (S6). In order to realize this, a pattern of single or stacked dots of printed material comprising foam inhibiting agent is applied onto the foamable decor layer after it is gelled in step 3. The surface of the foamable decor layer is ideally at ambient temperature. The printed material comprising the foam inhibiting agent is applied by digital printing, preferably by inkjet printing. The digitally printed material containing the foam inhibiting agent may also contain ink, but preferably not.

The inhibiting agent and ink may be deposited in separate printing operations onto the foamable layer. In a preferred embodiment, the inhibitor and ink are printed in the same printing operation with the ink, resulting in a chemical embossing pattern and digitally printed ink pattern forming decorative image. The advantage is that the inhibitor dots and ink dots can be printed independently from each other. A print head comprising the foam inhibiting agent is preferably combined with other print heads comprising only ink in an array of print heads, and wherein the foam inhibiting agent and the inks are digitally printed as part of a single printing operation. The foam inhibiting agent may be printed above, underneath, alongside and/or between the ink dots.

After application, the foaming inhibiting agent penetrates into the decor layer, and will counteract the development/expansion of the foam during thermal treatment. Areas of the decor layer which have not been printed with the foam inhibiting agent or where no foam inhibiting agent has penetrated, are thus expanding normally upon thermal treatment, while expansion of the decor is suppressed or reduced in areas printed with the foam inhibiting agent, resulting in a surface with discontinuous chemically embossed relief pattern with indentations. The resolution of the chemical embossing pattern is preferably in the range of from 100 to 1200 dpi, more preferably of from 300 to 1000 dpi even more preferably between 360 and 600 dpi.

Moreover, naturally occurring images may be scanned using an optical and/or laser scanning system and uploaded in a database, thereby also taking into account the surface structure. The structure and image can then be further processed using image processing software, which may then be respectively applied as a chemically embossing pattern and a decorative print pattern to the top surface of the foamable decor layer using a digital printing technique. The devices used for the digital printing, for example an inkjet printer, may then be provided with a software that contains a database comprising, for example, different types of wood or stone patterns and surface structures, or any other decor designs.

Mechanical Embossing of the Wear-Resistant Layer

In a preferred embodiment, the wear-resistant layer is provided with a mechanically embossed surface structure. This is done by applying an embossing mould having a structured surface to the upper surface of the still liquid wear-resistant layer before gelling starts. The liquid wear-resistant layer then still has sufficient fluidity to flow and adapt to the structured surface of the mould. The wear-resistant layer is gelled at a temperature in the range of 50° C. to 160° C. while the mould remains in contact with the surface of the wear-resistant layer. During this process the surface texture of the mould is transferred to the surface of the wear-resistant layer. The mould is preferably removed from the wear-resistant layer after the layer is gelled. The mould may be removed at a later stage in the process, for instance after fusion of the decor layer and wear-resistant layer (up to 200° C.). The realized embossed surface structure comprises raised areas and recessed areas.

The embossing mould preferably has a large surface area to reduce repetition and to ensure sufficient contact time for gelling.

The embossing mould may include any of:
a. A surface structured release web, such as casting paper. The web may be endless or may comprise discrete lengths. For economic reasons, the casting paper may be re-usable.
b. A surface structured rubber sleeve.
c. A surface structured belt, optionally coated with a non-stick material such as PTFE.
d. A surface structured plate which can be placed on the coating to be embossed or the coating can be lifted against it.
e. A structured cylinder or texture roll, which can be used for a process similar to gravure printing to transfer a surface structure.

The inventors have found that the process according to this invention allows for a very efficient transfer of surface structure.

Preferably, the surface structure is aligned with characteristics of the digitally printed decor in order to provide the surface relief and the printed decor in register.

In a preferred embodiment, the wear-resistant layer is provided with a mechanically embossed surface structure by means of release web having a specific surface structure. The surface structure of the release web comprises micro- and nanoscale features and is a 3-D negative image of the desired surface structure, for instance a wood texture. The release web is laminated with its structured surface downwards onto the still liquid wear-resistant layer before gelling starts. The wear-resistant layer then still has sufficient fluidity to flow and adapt to the structured surface of the release web. The release web is preferably nipped against the coating by means of a nip roll or a belt. The roll or belt is placed at a distance that ensures intimate contact between the web and the coating at least during the gelling stage. In contrast with traditional embossing processes, no additional pressure is exerted to realize an intimate contact and sufficient depths. The fact that no additional pressure is applied takes away the risk of collapse of a foamed substrate during the embossing process. Also, the structure on the release web is able to transfer all surface structure from nanoscale to macroscale features. The wear-resistant layer is gelled at a temperature in the range of 50° C. to 160° C. while the release webs remains in contact with the surface of the wear-resistant layer. The release web is preferably removed from the surface of the wear-resistant layer after the layer is gelled. For economic reasons, the release web should be capable of repeated re-use. The release web may also be formed as an endless band which is repeatably used. Hence, the process step of creating the surface structures in the wear-resistant layer can be continuous. Preferably the release web is aligned with the digital print pattern of the decor layer.

The above functions require a release web with a good temperature stability and thermal durability, since it is exposed to high temperatures during each gelling process (typically up to 160° C.). The release web may be removed at a later stage in the process, for instance after fusion of the decor layer and wear-resistant layer (up to 200° C.). The release web will then be exposed to higher temperature for a longer duration. This may limit the lifetime of the web and is therefore less preferred.

The structured release web comprises a surface which can be readily separated either from a gelled or a fused plastisol layer. In a preferred embodiment, the release web comprises a polymer coated paper used for replicative casting processes, typically referred to as casting paper or release paper. A variety of surface structure, for instance different types of wood grain structure, can be imparted to the polymer coating of the casting paper by the use of a precision-engraved embossing roll. Casting paper is for instance available as Ultracast (Sappi) or as Favini Release Paper (Favini).

The inventors found that mechanically embossing with a surface structured release web upon gelling of wear-resistant layer based on a PVC plastisol coating allows for the formation of very fine details, including nanoscale, independent of the depth or the recesses. It was furthermore found that the afforded wear-resistant layer comprising a fused plastisol very well retain the very fine (nanoscale) surface structures after removal of the release web. Further, the relatively large surface area of a surface structured release web reduces the repetition of relief pattern, which contributes to the natural appearance of the floor panel.

The appearance of the floor panel can be further improved when a chemically embossed decor layer is combined with a mechanically embossed wear-resistant layer.

In a further embodiment, a lacquer is transferred onto the wear-resistant layer while the latter is mechanically embossed (during S6). The wet lacquer is applied onto the structured surface of the embossing mould, preferably a release web, prior to the embossing process. The embossing mould comprising the wet lacquer is brought in contact with the still wet second plastisol layer during the embossing step (S6). The mould is removed and the lacquer is retained on the embossed wear-resistant layer. This provides an alternative for process step S7. The lacquer layer can be a continuous or discontinuous, transparent layer that conforms to mechanically and/or chemically embossed relief patterns to which it is applied.

Example 1 Floor Panel According to the Invention

1. A substrate made of an extruded foamed board with a thickness of 3.3 mm and a density of 1150 kg/m³ is prepared from the following raw materials: 14.75 wt. % s-PVC K-value 57 (Inovyn™ PVC 257RF from Inovyn), 19.97 wt. % micronized recycled PVC (Evervinyl™ from Paprec), 26.68 wt. % recycled material comprising PVC (waste material from milling and sanding of Pure Click products, BerryAlloc), 2.95 wt. % calcium carbonate (Omyalite™ 95 T from Omya), 30.25 wt. % talcum (CM3 from IMI Fabi), 0.64 wt. % stabiliser (CVG 53349/32 from Chemson), 0.74 wt. % processing aid (PA650 from Kaneka), 0.03 wt. % synthetic wax (A-C 316 A from Honeywell), 1.8 wt. % stabiliser (Naftosafe™ TRX 722 A4 from Chemson), 0.9 wt. % blowing agent (Zebra-cell C016K-10 from Zebra-chem), 0.89 wt. % impact modifier (CPE TYR7100 from Ravlek), and 0.4 wt. % carbon black (GP N0299 from Viba). The formed substrate has an upper surface and a lower surface. The substrate thickness in this example lies in the range 2.4 mm to 5.8 mm.

2. 400 μm of a first plastisol coating, which comprises 12.62 wt. % s-PVC with K value 66 (Solvin™ 266SF from Solvin), 21.03 wt. % microsuspension-PVC with K-value 67 (Solvin™ 367NF from Solvin), 8.41 wt. % microsuspension-PVC grade with K value 70 (B7021 from Vestolit), 7.57 wt. % dioctyl terephthalate, 4.21 wt. % isodecyl benzoate (Benzoflex™ 2088 by company Velsicol), 6.73 wt. % plasticizer (Jayflex™ MB10 from ExxonMobil), 35.73 wt. % chalk (Microdol™ A200 from Omya), 2.86 wt. % titanium dioxide (K2900 from Kronos), and 0.84 wt. % viscodepressant (Avi Visco 210 from Avivan) is applied directly onto the upper surface of the substrate with a reverse roller coating machine (e.g. type e.a.sy-Coater RCLM-M 1600 from Burkle) to obtain the decor layer.

3. The decor layer is gelled during 25 seconds at 150° C. by mean of an IR oven (shortwave, 50 kW/m²).

4. The substrate with the decor layer is cooled during 25 minutes at an ambient temperature of 22° C.

5. The decor layer is printed with UV curable inks by means of ink jet printing.

6. 700 μm of second PVC plastisol coating comprising 10.26 wt. % s-PVC with K value 66 (Solvin™ 266SF from Solvin), 41.03 wt. % microsuspension-PVC grade with K value 82 (Solvin™ 382NG from Solvin), 17.11 wt. % microsuspension-PVC grade with K value 90 (P1430K90 from Vestolit), 16.40 wt. % dioctyl terephthalate, 8.20 wt. % benzoate ester (Benzoflex™ 2088 from Velsicol), 3.40 wt. % isodecyl benzoate (Jayflex™ MB10 from ExxonMobil), 0.9 wt. % deaerating agent (Avi Aero 022 from Avivan), and 2.7 wt. % Ca—Zn stabiliser (CLX759/5PF from Reagens) is applied on the printed decor layer by means of a reverse roller coating machine (e.g. e.a.sy-Coater RCLM-M 1600 from Burkle) to obtain the wear-resistant layer.

7. The structured release paper (Ultracast®, Sappi) is laminated into the liquid wear-resistant layer. The decor layer and the wear-resistant layer with the laminated release paper are fused during 120 seconds at 195° C. by means of a convection oven (e.g. Mathis oven).

8. The product is allowed to cool down at an ambient temperature of 22° C. during 35 minutes.

9. The structured release paper is removed from the product.

The multi-layered top layer according to the first aspect of the invention is created in steps 2 to 9. The decor layer of this layer lies in the range 0.10 mm to 0.70 mm. The thickness of this wear-resistant layer lies in the range 0.10 mm to 1.00 mm, and more preferably in the range 0.10 mm to 0.70 mm, and most preferably from 0.20 to 0.70 mm.

The multi-layered top layer does not comprise a reinforcement layer. The substrate does not comprise a reinforcement layer. Floor panels are free of interlayer adhesive material. The interlayers which are free of adhesive are between the substrate and the décor layer, the décor layer and the wear-resistant layer and between the wear-resistant layer and an optional lacquer layer.

Example 2 Floor Panel According to the Invention

A floor panel was prepared according to Example 1, with the exception that a first plastisol coating with a thickness of 200 μm is applied in step 2. The decor layer is in the range 0.10 mm to 0.7 mm.

Example 3 Floor Panel with a Foamed Decor Layer According to the Invention

A floor panel was prepared according to Example 1, with the exception that a first plastisol coating comprising 10.82 wt. % suspension-PVC grade with K value 66 (Solvin™ 266SF from Solvin), 18.03 wt. % microsuspension-PVC grade with K value 67 (Solvin™ 367NF from Solvin), 7.21 wt. % microsuspension-PVC grade with K value 70 (B7021 from Vestolit), 15.3 wt. % dioctyl terephthalate, 2.88 wt. % benzoate ester (Benzoflex™ 2088 from Velsicol), 3.61 wt. % isodecyl benzoate (Jayflex™ MB10 from ExxonMobil), 36.03 wt. % chalk (Microdol™ A200 from Omya), 3.94 wt. % titanium dispersion, 0.94 wt. % blowing agent (Unifoam™ AZ CP022 from Hebron), 0.02 wt. % wetting and dispersing additive (Disperplast 1148 from BYK), 0.14 wt. % deaerating agent (Avi Aero 022 from Avivan), and 1.08 wt. % viscodepressant (Avi Visco 210 from Avivan) is applied in step 2 to obtain a foamable decor layer. The foamable decor layer was foamed during the fusing process in step 7.

Comparative Samples

Comparative Sample A is a calandered floor panel comprising a substrate made of a foamed PVC material, a PVC decor layer and a PVC wear layer. The floor panel further comprises a backing layer made of IXPE (Irradiated Cross-Linked Polyethylene).

Comparative Sample B is a floor panel consisting of a substrate made of a foamed PVC material and a top layer comprising a PVC print film and PVC wear layer. The floor panel further comprises a backing layer made of cork.

Comparative Sample C is a calandered floor panel consisting of a PVC substrate and a printed PVC wear layer.

Comparative Sample D is a floor panel comprising a substrate made of polyurethane material, a decor paper and polyurethane top layer with surface structure. The floor panel further comprises a backing layer made of Integrated Fleece TEC-system.

Comparative Sample E is a floor panel comprising a substrate according to Example 1 attached to a cushion vinyl layer with a total thickness of 1.55 mm. The cushion vinyl comprises a glass fibre layer.

Elastic Moduli of Floor Panels According to the Invention

The multi-layered top layers of the floor panels of Examples 1-3 and Comparative samples A-E were separated from their substrates by means of a cutter knife and/or pliers. The elastic modulus of the substrate of the floor panels of Examples 1 to 3 and Comparative samples A-E was measured at 23±2° C. and 50±10% R.H., according to ISO 527-2: 2012. The elastic modulus of the multi-layered top layers of the floor panels of Examples 1 and 3 and comparative samples A-E was measured at 23±2° C. and 50±10% R.H., according to ISO 527-2:2012. The elastic modulus of the multi-layered top layer of the floor panel of Example 2 was measured at 23±2° C. and 50±10% R.H., according to ISO 527-3:2018. All test specimens were cut or punched to the dimensions of specimen type 1B. The test speed of the tensile-testing machine was maintained at 1 mm/min.

The ratio between elastic moduli of the substrate and multi-layered top layer was calculated.

TABLE 1

Elastic moduli of substrate and multi-layered top layers.

| Covering panel | Elastic modulus substrate | Elastic modulus multi-layered top layer | ratio between elastic moduli |
|---|---|---|---|
| Example 1 | 2800 MPa | 39 MPa | 71.8 |
| Example 2 | 2800 MPa | 36 MPa | 77.8 |
| Example 3 | 2800 MPa | 32 MPa | 87.5 |
| Comparative sample A | 1293 MPa | 155 MPa | 8.3 |
| Comparative sample B | 473 MPa | 226 MPa | 2.1 |
| Comparative sample C | 116 MPa | 88 MPa | 1.3 |
| Comparative sample D | 121 MPa | 1040 MPa | 0.1 |
| Comparative sample E | 2800 MPa | 134 MPa | 20.9 |

Determination Hot Curling and Cold Curling

The vertical deformations of the floor panels of example 1-3 and comparative floor panels (Comparative Samples A-E) comprising one or more laminated or calandered films were determined after specific heat or cold treatment.

For each curling test three square test specimens (24×24 cm) were cut from the floor panel or plank. The edges of the specimen were cut in parallel or transverse to the direction of manufacture. The test specimens were conditioned at a temperature of 23° C.+/−2° C. and relative humidity of 50%+/−5% for minimum 24 h.

For the hot curling test, the specimens were horizontally placed onto pre-heated steel support plates (50+/−3° C.) with the wear-resistant layer of the sample facing up. The steel support plates have larger dimensions than the test specimen and a thickness of 1.5 mm.

The vertical distances between the steel support plate and the wear-resistant surface in the four corners of the test specimens were measured (distance t1 to t4). The distances were measured with a height gauge with a graduation of 0.01 mm.

The test specimens were placed in an oven and allowed to come to a temperature of 50+/−3° C. and were maintained at this temperature for 1 hour. The oven is thermostatically controlled and ventilated, capable of being maintained at a uniform temperature.

The specimens were taken out of the oven. The specimens were not allowed to recondition and directly measured. The vertical distance between the support plate and the wear-resistant surface of the test specimens was measured in the four corners of each specimen (distances u1 to u4). The specimens were turned and placed with the wear-resistant layer downwards onto the steel support plates. The vertical distances were measured again in the four corners (distances d1 to d4).

To calculate the curling of each specimen, it was firstly determined if the sample curled upwards or downwards by comparing the average of u1-u4 with the average of d1-d4. If the average distance when facing up (u1-u4) was largest the curling of the specimen was calculated by subtracting the average thickness (average t1-t4) from the average of u1-u4. If the average of d1-d4 was the largest, the average curling was determined by subtracting the average of d1-d4 from t1-t4 in order to obtain a negative value which represents the downward curling of the specimen.

For the cold curling test, the specimens were horizontally placed onto pre-cooled steel support plates (5+/−1° C.). The refrigerator is thermostatically controlled, capable of being maintained at a uniform temperature. The steel support plates have larger dimensions than the test specimen and a thickness of 1.5 mm.

The test specimens were placed in a refrigerator and allowed to come to a temperature of 5+/−1° C. The specimens were maintained at this temperature for 24 hours.

The specimens were taken out of the refrigerator. The specimens were not allowed to recondition and directly measured. The vertical distance between the support plate and the wear-resistant surface of the test specimens was measured in the four corners of each specimen (distances u1-u4). The specimens were turned and placed with the wear-resistant layer downwards onto the steel support plates. The vertical distances were measured again in the four corners (distances d1-d4).

To calculate the curling of each specimen, it was firstly determined if the sample curled upwards or downwards by comparing the average of u1-u4 with the average of d1-d4. If the average distance when facing up (u1-u4) was largest the curling of the specimen was calculated by subtracting the average thickness (average t1-t4) from the average of u1-u4. If the average of d1-d4 was the largest, the average curling was determined by subtracting the average of d1-d4 from t1-t4 in order to obtain a negative value which represents the downward curling of the specimen.

Finally, the vertical deformations of the panels were determined by taking the average value of three specimens. The vertical deformations due to hot curling or cold curling are shown in Table 2.

The results in Table 2. show that covering panels according to the current invention (Examples 1-3) perform very well in both the hot curling test and cold curling test. Comparative Samples A-C do well in the hot curling test but show significant curling in the cold curling test. Comparative Sample D-E performs badly in both the hot curling test and cold curling test.

TABLE 2

Curling of floor panels after exposure to heat or cold.

| | Hot curling (mm) | Cold curling (mm) |
|---|---|---|
| Example 1 | −0.07 | −0.06 |
| Example 2 | −0.02 | 0.08 |
| Example 3 | −0.04 | 0.25 |
| Comparative sample A | 0.09 | 1.08 |
| Comparative sample B | −0.07 | 0.58 |
| Comparative sample C | 0.07 | 0.51 |
| Comparative sample D | 0.55 | 0.47 |
| Comparative sample E | −1.29 | −0.75 |

The invention claimed is:

1. A floor panel comprising:
a substrate;
a multi-layered top layer directly attached to the substrate; wherein the multi-layered top layer comprises:
a decor layer comprising a fused PVC plastisol,
a print pattern deposited as single or stacked dots of a digitally printed material on top of the decor layer,
a wear-resistant layer comprising a fused PVC plastisol provided above the print pattern, wherein the wear-resistant layer is obtained by gelling a PVC plastisol and by mechanically embossing the PVC plastisol during gelling and subsequently fusing the gelled PVC plastisol to obtain the fused wear-resistant layer, wherein the ratio between elastic moduli of the substrate and multi-layered top layer is at least 20 measured at 23±2° C. and 50±10% R.H. according to ISO 527.

2. The floor panel according to claim 1, further comprising a lacquer layer provided directly on top of the wear-resistant layer.

3. The floor panel according to claim 2, wherein the lacquer layer is a continuous or discontinuous, transparent layer that conforms to a mechanically and/or chemically embossed relief pattern, or
wherein the lacquer layer is conformal with the wear-resistant layer.

4. The floor panel according to claim 1, wherein the multi-layered top layer has an elastic modulus of less than 100 MPa at 23° C. measured at 23±2° C. and 50±10% R.H., according to ISO 527 or wherein the multi-layered top layer does not comprise a reinforcement layer.

5. The floor panel according to claim 1, wherein the substrate has an elastic modulus of more than 2000 MPa measured at 23±2° C. and 50±10% R.H., according to ISO 527 or
wherein the substrate is a single layer substrate, or
wherein the substrate does not comprise a reinforcement layer, or
wherein the substrate is a foamed substrate, or
wherein the substrate is a single layer substrate.

6. The floor panel according to claim 1, wherein the floor panel is free of interlayer adhesive material.

7. The floor panel according to claim 6, wherein a density of the foamed substrate is equal to or less than 1600 kg/m$^3$, and the density is equal to or more than 400 kg/m$^3$, or
wherein the density is in the range 1050 kg/m$^3$ to 1300 kg/m$^3$.

8. The floor panel according to claim 1, wherein the substrate has a thickness of 1 mm to 25 mm, or
wherein the substrate has a glass transition temperature ($T_g$) of 80° C. or higher.

9. The floor panel according to claim 1, wherein the decor layer comprises a chemically embossed relief pattern formed by single or stacked dots of digitally printed material comprising a foam inhibiting agent, or wherein a thickness of the décor layer is in the range 0.1 to 0.7 mm.

10. The floor panel according to claim 1, wherein the wear-resistant layer has a mechanically embossed surface structure.

11. The floor panel according to claim 1, comprising a surface with different gloss levels comprising first zones with high gloss, second zones with silk gloss, and third zones with matt, or
wherein the surface has macro, micro, and nanoscale features.

12. The floor panel according to claim 11, wherein the one or more zones of a surface of the panel which has/have a gloss value or macro, micro, and nanoscale features are aligned with one or more parts of the print pattern.

13. The floor panel according to claim 1, wherein the resistance against separation of the substrate and the multi-layered top layer by peeling is at least 50 N/50 mm as determined by a peel test.

14. A method for producing a floor panel comprising the subsequent steps of:
- S1: providing a substrate,
- S2: applying a first coating comprising a PVC plastisol directly onto the substrate to obtain a decor layer,
- S3: gelling the decor layer,
- S4: applying a print pattern of single or stacked dots of printing material directly onto the gelled decor layer by means of digital printing,
- S5: applying a second coating comprising a PVC plastisol onto the printed decor layer to obtain a wear-resistant layer, and
- S6: gelling the wear-resistant layer and subsequently fusing the decor layer and wear-resistant layer, and further comprising the step of mechanically embossing the wear-resistant layer with an embossing mould during gelling, wherein the embossing mould is a release web, or wherein the embossing mould is a polymer coated paper.

15. The method according to claim 14, further comprising a step of: S7: applying a lacquer layer directly on top of the fused wear-resistant layer.

16. The method according to claim 15, wherein the lacquer layer is conformal with the wear-resistant layer, or wherein the lacquer layer is a continuous or discontinuous, transparent layer that conforms to a mechanically and/or chemically embossed relief pattern.

17. The method for producing a floor panel according to claim 14, wherein the floor panel is free of interlayer adhesive material.

18. The method for producing a floor panel according to claim 14, wherein the substrate is a foamed substrate, or wherein the substrate is a single layer substrate.

19. The method for producing a floor panel according to claim 14, further comprising the steps of:
- providing a blowing agent into the first coating to obtain a foamable decor layer in step S2,
- applying a pattern of single or stacked dots of printed material comprising foam inhibiting agent onto the gelled foamable decor layer by means of digital printing, and
- foaming the foamable decor layer in step S6.

20. The method for producing a floor panel according to claim 14, wherein the embossing mould is in contact with the wear-resistant layer during gelling without exerting additional pressure.

21. The method according to claim 14, comprising generating multiple gloss levels in first zones with high gloss, second zones with silk gloss, and third zones which are matt on a surface of the floor panel, or
   wherein the surface has macro, micro, and nanoscale features.

22. The method according to claim 21, wherein one or more zones of a surface of the panel which has/have a gloss value or macro, micro, and nanoscale features are aligned with one or more parts of a print pattern.

23. A floor panel comprising:
   a substrate;
   a multi-layered top layer directly attached to the substrate, wherein the multi-layered top layer comprises:
   a decor layer comprising a fused PVC plastisol,
   a print pattern deposited as single or stacked dots of a digitally printed material on top of the decor layer,
   a wear-resistant layer comprising a fused PVC plastisol provided above the print pattern, wherein the wear-resistant layer is obtained by gelling a PVC plastisol and by mechanically embossing the PVC plastisol during gelling and subsequently fusing the gelled PVC plastisol to obtain the fused wear-resistant layer, wherein resistance against separation of the substrate and the multi-layered top layer to peeling is at least 50 N/50 mm.

* * * * *